（12) United States Patent
Smaardyk et al.

(10) Patent No.: US 8,754,362 B2
(45) Date of Patent: Jun. 17, 2014

(54) METHOD FOR DETECTING FRACTURES AND PERFORATIONS IN A SUBTERRANEAN FORMATION

(71) Applicant: GE Oil & Gas Logging Services, Inc., Houston, TX (US)

(72) Inventors: John Edward Smaardyk, Houston, TX (US); Donald K. Steinman, Missouri City, TX (US); Russel Hertzog, Jr., Georgetown, TX (US)

(73) Assignee: GE Oil & Gas Logging Services, Inc., Houston, TX (US)

( * ) Notice: Subject to any disclaimer, the term of this patent is extended or adjusted under 35 U.S.C. 154(b) by 0 days.

(21) Appl. No.: 13/645,248

(22) Filed: Oct. 4, 2012

(65) Prior Publication Data
US 2013/0043381 A1    Feb. 21, 2013

Related U.S. Application Data (63) Continuation-in-part of application No. 13/332,543, filed on Dec. 21, 2011, which is a continuation-in-part of application No. 12/496,163, filed on Jul. 1, 2009.

(51) Int. Cl.
*G01V 5/08*    (2006.01)
(52) U.S. Cl.
CPC ................................ *G01V 5/08* (2013.01)
USPC ..................................................... 250/269.1
(58) Field of Classification Search
CPC ............................... G01V 5/08; G01V 5/125
USPC ............................................ 250/269.1–269.8
See application file for complete search history.

(56) References Cited

U.S. PATENT DOCUMENTS

| 3,321,627 | A |   | 5/1967  | Tittle                        |
|-----------|---|---|---------|-------------------------------|
| 3,564,251 | A | * | 2/1971  | Youmans ............. 250/269.1 |
| 3,784,828 | A | * | 1/1974  | Hayes .................... 250/260 |
| 4,034,218 | A |   | 7/1977  | Turcotte                      |
| 4,423,323 | A |   | 12/1983 | Ellis et al.                  |
| 4,926,940 | A | * | 5/1990  | Stromswold ........... 166/247  |
| 5,077,471 | A | * | 12/1991 | Smith et al. ............ 250/260 |
| 5,353,637 | A | * | 10/1994 | Plumb et al. ........... 73/152.17 |

(Continued)

FOREIGN PATENT DOCUMENTS

GB        2320567 A    6/1998

OTHER PUBLICATIONS

Neal et al., "A Quantitative Approach to Gravel Pack Evaluation", SPE #12477, Formation Damage Control Symposium, Feb. 13-14, 1984, 6 pages.

(Continued)

*Primary Examiner* — Kiho Kim
(74) *Attorney, Agent, or Firm* — Bracewell & Giuliani LLP (57) ABSTRACT

Fractures at a wellbore wall and in a region surrounding a wellbore wall can be detected by monitoring gamma rays scattered from the fractures. Gamma rays are strategically directed from a tool disposed within the wellbore and to the wall and/or the region. Some of the gamma rays scatter from the fractures and are detected with detectors set a designated axial distance from the gamma ray source. In addition to identifying the presence of the fractures, the location and size of the fractures is also estimated. Based on the location and disposition of the fractures, perforations are formed in the formation to provide communication between the fractures and the wellbore.

20 Claims, 5 Drawing Sheets

(56) References Cited

U.S. PATENT DOCUMENTS

| | | | |
|---|---|---|---|
| 5,404,010 A * | 4/1995 | Anderson et al. | 250/260 |
| 5,410,152 A * | 4/1995 | Gadeken | 250/260 |
| 5,442,173 A * | 8/1995 | Wraight | 250/260 |
| 5,517,854 A * | 5/1996 | Plumb et al. | 73/152.59 |
| 5,608,214 A | 3/1997 | Baron et al. | |
| 5,635,712 A * | 6/1997 | Scott et al. | 250/260 |
| 6,554,065 B2 | 4/2003 | Fisher et al. | |
| 7,059,404 B2 | 6/2006 | Flecker et al. | |
| 7,482,578 B2 * | 1/2009 | Randall | 250/261 |
| 7,573,027 B2 * | 8/2009 | Huiszoon | 250/269.1 |
| 2004/0210393 A1 | 10/2004 | Ellis | |
| 2005/0205798 A1 | 9/2005 | Downing et al. | |
| 2007/0137894 A1 | 6/2007 | Fujisawa et al. | |
| 2007/0284518 A1 * | 12/2007 | Randall | 250/261 |
| 2008/0061225 A1 | 3/2008 | Orban et al. | |
| 2008/0083872 A1 * | 4/2008 | Huiszoon | 250/269.3 |
| 2008/0116365 A1 | 5/2008 | Flecker | |
| 2010/0017134 A1 | 1/2010 | Steinman et al. | |
| 2012/0119077 A1 | 5/2012 | Smaardyk | |

OTHER PUBLICATIONS

International Search Report and Written Opinion (PCT/US2009/003913), dated Sep. 3, 2009.
Examination Report (GB1021621.6), dated Aug. 2, 2011.
PCT International Search Report mailed Apr. 2, 2014.

* cited by examiner

METHOD FOR DETECTING FRACTURES AND PERFORATIONS IN A SUBTERRANEAN FORMATION

CROSS REFERENCE TO RELATED APPLICATIONS

This application is a continuation-in-part and claims the benefit of co-pending U.S. application Ser. No. 13/332,543 filed Dec. 21, 2011, which is a continuation-in-part of and claims the benefit of U.S. application Ser. No. 12/496,163 filed Jul. 1, 2009, the full disclosures of which are hereby incorporated by reference herein for all purposes.

BACKGROUND

1. Field of Invention

The invention relates generally to detecting and characterizing fractures in a subterranean wellbore. More specifically, the present invention relates to a device and method that uses a radiation source for inspecting a subterranean formation and a radiation detector for detecting or identifying the presence of fractures in a formation adjacent the tubular.

2. Description of Prior Art

Subterranean wellbores used for producing hydrocarbons typically are lined with a casing string that is cemented to the formation intersected by the wellbore. The casing and the surrounding formation are then perforated to provide fluid communication between the formation and interior of the casing. Fluid produced from the well flows through the perforations, to within the casing, and to the surface within production tubing that is inserted inside the inner casing string.

Some hydrocarbon bearing formations can have low permeability due to the presence of shale, or very tight formation rock (such as in limestone formations); which in turn can limit hydrocarbon production. However, natural or man-made fractures in these formations can increase formation permeability thereby increasing hydrocarbon production. Identifying the location and size of these fractures are of considerable importance in determining which part of the borehole to perforate and produce. Often, a layer of shale is on top of a formation that contains hydrocarbons. Generally, it is more stable to drill in the layer of shale than the hydrocarbon bearing formation. In these situations, a wellbore is drilled through the shale with the hopes of intersecting a fracture in the shale that extends into the reservoir having the hydrocarbons, as fractures increase permeability of a subterranean formation.

SUMMARY OF THE INVENTION

Disclosed herein is a method of wellbore operations that in one example includes directing radiation from a source to a formation surrounding the wellbore, detecting radiation scattered from the formation, estimating a rate and energy of the detected radiation, and identifying a fracture in the formation based on the change of the count rate and energy of the detected radiation. In an example, the wellbore is lined with casing, so that at least some of the radiation from the source passes through a wall of the casing from inside the casing. Also in this example, at least a portion of the radiation scattered from the formation returns back through the wall of the casing from outside of the casing. Optionally, the step of detecting radiation is performed using a detector offset from the source. The radiation can be directed in a substantially conical pattern from the source and the energy of the detected radiation can be dependent upon an angle of scatter of the radiation. In one example, the method can further include estimating a thickness of the fracture, and/or further include estimating a location of the fracture. The fracture can also intersect a wall of the wellbore.

Also disclosed herein is an alternate method of operation in a wellbore, where the wellbore is lined with casing. In this example, the method includes providing a logging instrument having a radiation source and a radiation detector, disposing the logging instrument into the wellbore and inside the casing, and directing radiation from the source to a formation surrounding the wellbore and along a path. At least some of the radiation scatters in a direction from the formation towards the radiation detector and is detected with the radiation detector. Based on a change in rate of the detected radiation, a fracture in the formation is identified. This example may further include setting the radiation source and radiation detector a designated distance apart. Optionally, the source and detector may be set a different distance apart so that the radiation detected by the radiation detector is scattered from an annular region of the formation that circumscribes the wellbore. The method can further involve providing a multiplicity of detectors at spaced apart locations around a circumference of the logging instrument, viewing different circumferentially spaced apart segments with the detectors, and imaging substantially an entire circumference of a lengthwise portion of the tubular. In one example embodiment, the logging instrument is moved to different depths in the wellbore during the steps of emitting and receiving radiation as well as during the step of identifying a fracture in the formation. A vertical thickness of the fracture can be estimated based on the depths at which a change of rate of the radiation is detected. Moreover, a location of the fracture can be estimated by monitoring a depth of the logging tool. In an example, the formation is adjacent a hydrocarbon bearing formation, and the fracture is in communication with fluid in the hydrocarbon bearing formation.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method of the present disclosure will now be described more fully hereinafter with reference to the accompanying drawings in which embodiments are shown. The method of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, the improvements herein described are therefore to be limited only by the scope of the appended claims.

Figure 1:
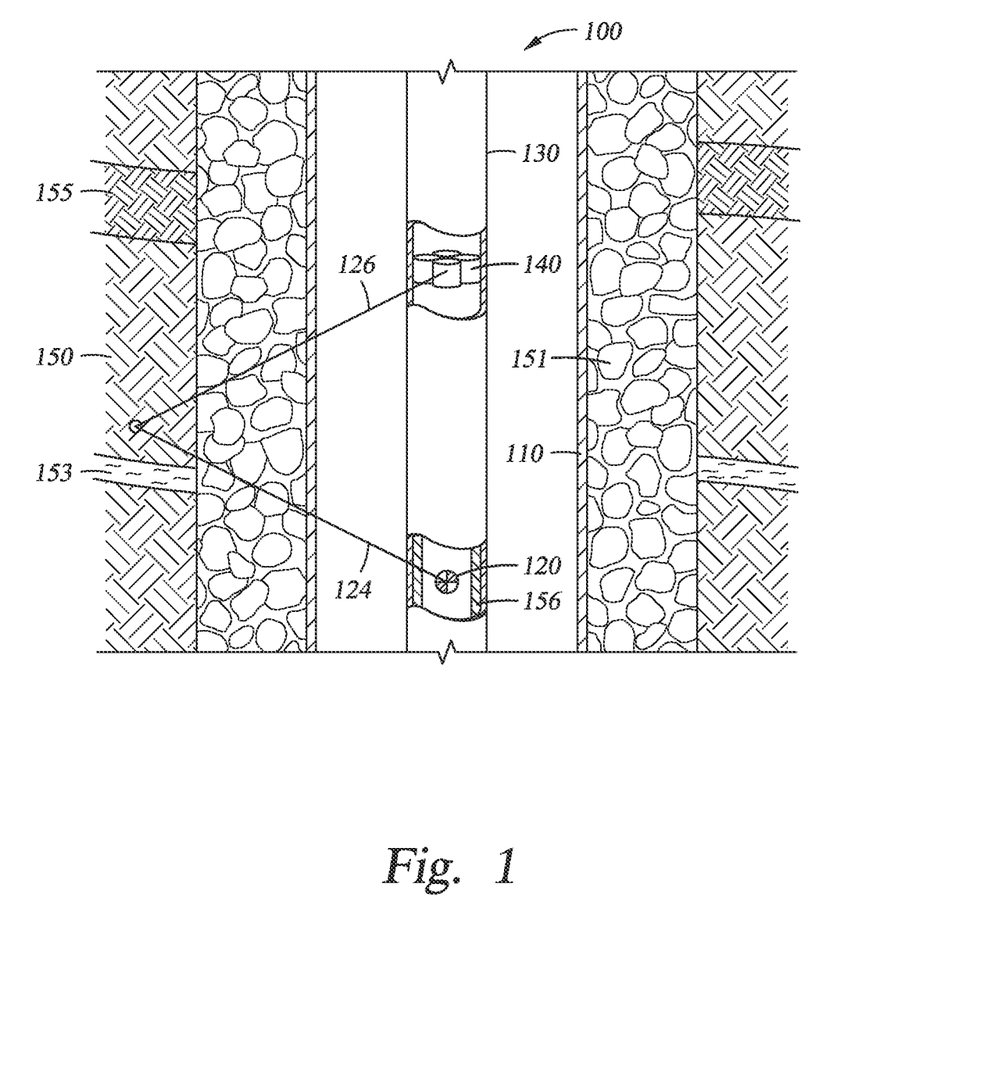
FIG. 1 a schematic of an example embodiment of a downhole imaging tool having a radiation source and detectors disposed in a wellbore in accordance with the present invention.

Referring now to FIG. 1 a downhole imaging tool 100 is shown positioned in a section of casing or inner steel housing 110 of a wellbore. It is recognized that a tool housing 130 may be constructed of any light metal wherein the term, "light metal," as used herein, refers to any metal having an atomic number less than 23. Downhole imaging tool 100 includes at a minimum a housing or pipe 130 carrying a radiation source 120 and plurality of detectors 140. In one example embodiment, gamma radiation source 120 is centrally located in housing 130. Optionally, detectors 140 are symmetrically spaced apart azimuthally at a constant radius, but also positioned within housing 130. In other words, in one example, the radius on which detectors 140 are spaced apart is less than the radius of the housing 130. Radiation source 120 emits radiation, in this case, gamma rays 124 into formation 150 surrounding the casing 110. Cement 151 is between the casing 110 and formation 150.

The formation 150 of FIG. 1 includes fractures 153, 155 that could be fluid-filled or not. For example, fracture 153 contains completion fluids or production fluids, whereas fracture 155 is partially or fully sand filled. Of course, those skilled in the art, with the benefit of this disclosure, will appreciate that these are for illustrative purposes only and that fractures 153, 155 could take any shape and any position.

In the example of FIG. 1, gamma rays 124 propagating into formation 150 are Compton scattered with a loss of some energy back towards detectors 140 located within downhole imaging tool 100. The reduced-energy gamma rays 126 are detected by detectors 140. The count-rate intensity of Compton scattered gamma rays 126 depends on, among other factors, the width of the fracture. Hence, higher count rates represent higher density material in the formation, whereas lower count-rates represent lower density as a result of fewer gamma rays being back-scattered towards the detectors.

In an example, radiation source 120 includes barium, cesium, some other radiation source, or combinations thereof. By utilizing a source such as this, and because the detectors are located close to the source, detected energy originates only from a short distance into the formation immediately adjacent the casing. For these same reasons, in one example detectors 140 are positioned in housing 130 proximate to radiation source 120. In one example embodiment, radiation source 120 and detectors 140 are within about 3 to about 3.5 inches apart along the length of tool 100.

Shielding 156 may be applied around radiation source 120 to collimate or otherwise limit the emission of radiation from radiation source 120 to a restricted longitudinal segment of formation 150. In an embodiment, such shielding is a heavy metal shield, such as sintered-tungsten, which collimates the pathway for the emitted gamma rays into the gravel pack. Likewise, as described in more detail below, similar shielding may be used around each detector to limit the detector viewing aperture to only those gamma rays that are primarily singly-scattered back to the detector from a specific azimuthal section of the formation.

Further, the energy levels of the emitted gamma rays 124 may be selected to assess fracture characteristics at varying depths or distances from downhole imaging tool 100. As one example, the radiation from a gamma ray source, such as a $^{133}$Ba source, may be used to emit various energy levels. Alternatively, a gamma ray radiation source with energy such as $^{137}$Cs may be used.

To produce an accurately oriented map of the fracture locations, the azimuthal angle of the logging tool relative to the high side of the borehole is determined. This orientation can be determined using any orientation device known in the art. Orientation devices may contain one or more attitude sensors used to determine orientation of the logging tool with respect to a reference vector. Examples of suitable orientation devices include, but are not limited to, those orientation devices produced by MicroTesla of Houston, Tex. Each set of gamma ray measurements may be associated with such an orientation so that a 2D profile map of the formation can be accurately generated in terms of the actual azimuthal location of the fracture.

Figure 2:
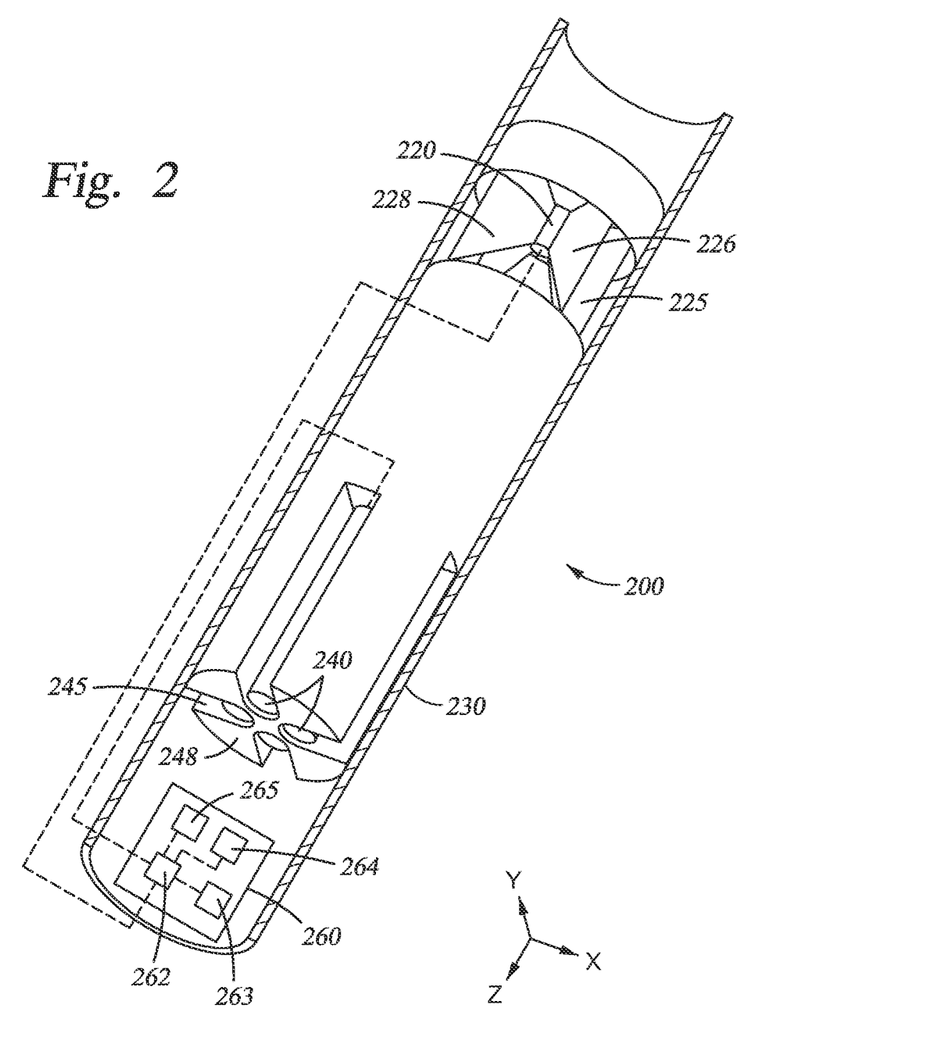
FIG. 2 is a perspective view of one embodiment of the tool of FIG. 1 in accordance with the present invention.

FIG. 2 illustrates a perspective view of one embodiment of a gravel pack imaging tool. As shown, downhole imaging tool 200 includes a housing 230 which carries radiation source 220, source collimator 225, and a plurality of radiation detectors 240 in an array. The array of detectors 240 may be positioned at a fixed distance from radiation source 220. In certain embodiments, detector arrays may be positioned at differing distances from radiation source 220. Additionally, detector arrays on either side of radiation source 220 are also envisioned in certain embodiments. Electronics 260 may also be located in housing 230 or wherever convenient.

Radiation source 220 may be one or more radiation sources, which may include any suitable low-energy gamma ray source capable of emitting gammy ray radiation from about 250 keV to about 700 keV. Gamma ray sources suitable for use with embodiments of the present invention may include any suitable radioactive isotope including, but not limited to, radioactive isotopes of barium, cesium, a LINAC, high energy X-rays (e.g. about 200+ keV), or any combination thereof. Radiation from radiation source 220 may be continuous, intermittent, or pulsed.

In one example embodiment shown in FIG. 2, a radiation source 220 is centrally located in housing 230. In the illustrated embodiment, source 220 is positioned along the axis of housing 230.

Gamma-Ray collimator 225, which is optional in certain embodiments, may be—configured adjacent to the source 220 in order to directionally constrain radiation from the radiation source 220 to an azimuthal radiation segment of the formation. For example, collimator 225 may include fins or walls 226 adjacent source 220 to direct gamma ray propagation. By directing, focusing, or otherwise orienting the radiation from radiation source 220, radiation may be guided to a more specific region of the formation. It is appreciated that in certain embodiments, a heavy-met shutter mechanism could be further employed to direct radiation from radiation source 220. Additionally, the radiation energy may be selected, by choosing different isotopic sources, so as to provide some lithological or spatial depth discrimination.

In the illustrated embodiment, collimator 225 constrains radiation from source 220. In this embodiment, collimator 225 is also conically shaped as at 228, in the direction of detectors 240 to collimate the gamma rays from source 220. Of course, those skilled in the art will appreciate that collimator 225 may be configured in any geometry suitable for directing, focusing, guiding, or otherwise orienting radiation from radiation source 220 to a more specific region of the formation.

In one non-limiting example, the radiation transmitted from source 220 into a formation (such as formation 150 of FIG. 1) is Compton scattered back from the formation to tool 200 where the back-scattered radiation may be measured by radiation detectors 240. Radiation detectors 240 can be any plurality of sensors suitable for detecting radiation, including gamma ray detectors. In the illustrated embodiment, four detectors are depicted, although any number of detectors can be utilized. In another example embodiment, three detectors or six detectors are utilized; where optionally, each detector is disposed to "view" a different segment of the formation. Employing multiple detectors, the tool can image the entire circumference of the casing 110 in separately identifiable segments. The resolution of the image of the overall circumference can depend on the number of detectors, the energy of the gamma rays and the degree of shielding provided around each detector.

In certain embodiments, gamma ray detectors may include a scintillator crystal that emits light proportional to the energy deposited in the crystal by each gamma ray. A photomultiplier tube may be coupled to the crystal to convert the light from the scintillation crystal to measurable electron current or voltage pulse, which is then used to quantify the energy of each detected gamma ray. In other words, the gamma rays' energies are quantified, counted, and used to estimate the density of the formation adjacent a screen. Photomultiplier tubes may be replaced with high-temperature charge-coupled devices (CCD) or micro-channel photo-amplifiers. Examples of suitable scintillator crystals that may be used include, but are not limited to, NaI(T1) crystals, BGO, and Lanthanum-bromide, or any combination thereof. In this way, count-rates may be measured from returned radiation, in this case, returned gamma rays. The intensity of the Compton scattered gamma rays depends on, among other factors, the density of the formation material. Hence, lower density represents gaps in the formation, such as may be caused by the formation being fractured and lower count-rates represent lower density as a result of fewer gamma rays being back-scattered towards the detectors.

Still referring to FIG. 2, in an example embodiment detectors 240 are mounted inside a housing at a radius smaller than the radius of housing 230 inset from the surface of housing 230. Likewise, while they need not be evenly spaced, in the illustrated embodiment, detectors 240 are evenly spaced on the selected radius. Although the illustrated example shows four detectors 240 spaced apart 90 degrees from one another, those skilled in the art will appreciate that any number of multiple detectors can be utilized in the invention. Further, while the embodiment illustrates all of the detectors 240 positioned at the same distance from source 220, they need not be evenly spaced. Thus, for example, one detector (or a multi-detector array) might be spaced apart 12 centimeters from the source, while another detector (or a detector array) is spaced apart 20 centimeters from the source or any other distance within the tool.

Similarly, in another embodiment, detectors 240 can be positioned both above and below source 220. In such a case, collimator 225 would be appropriately shaped to guide gamma rays in the direction of the desired detectors. In such embodiments with multiple detectors disposed on both sides of the radiation source, additional shielding may be provided between the collimators to prevent radiation scattering (i.e. cross-contamination of the radiation) from different segments of the formation.

Each detector 240 may be mounted so as be shielded from the other detectors 240. While any type of shielding configuration may be utilized for the detectors 240, in the illustrated embodiment, collimator 248 is provided with a plurality of openings or slots 245 spaced apart around the perimeter of collimator 248. Although openings 245 could have any shape, such as round, oval, square or any other shape, in one example embodiment openings 245 are shaped as elongated slots and will be referred to as such herein.

A detector 240 is mounted in each slot 245, so as to encase detector 240 in the shield. The width and depth of the slot 245 can be adjusted as desired to achieve the desired azimuthal range. In certain embodiments the length of slots 245 can be as long as the sensitive region of the gamma-ray detector (e.g. the crystal height). It will be appreciated that since a detector is disposed within the slot, the detector is not on the surface of the collimator where it might otherwise detect gamma rays from a larger azimuthal range. In an example embodiment, slot 245 is 360/(number of detectors) degrees wide and the detector face to inner diameter of the pressure housing is a few millimeters deep (e.g. from about 2 to about 5 mm). However, tighter collimation is possible. Optionally, the azimuthal range of each slot is limited to 360/(number of detectors) degrees. In this way, the view of each radiation detector 240 may be more focused on a particular region of the formation. Additionally, such shielding eliminates or at least mitigates radiation scattered from one detector to another detector. As can be seen, each detector is separated from one another by radiation absorbent material. By eliminating detector-to-detector radiation scattering, more precise azimuthal readings are achieved.

While source collimator 225 is shown as a single, integrally formed body, having fins 226, and conical surface 228, it need not be and could be formed of separate structural components, such as a source collimator combined with a detector collimator 248, so long as the shielding as described herein is achieved.

In the illustrated embodiment, the region of housing 230 around the opening in source collimator and detectors 240 may be fabricated of beryllium, aluminum, titanium, or other low atomic number metal or material, the purpose of which is to allow more of the gamma rays to enter detectors 240. This design is especially important for lower energy gamma rays, which are preferentially absorbed by any dense metal in the pressure housing.

Alternatively, or in addition to detector shielding or collimator 248, an anti-coincidence algorithm may be implemented in electronics 260 to compensate for detector-to-detector radiation scattering. In this way, a processor can mitigate the effects of multiply-detected gamma rays via an anti-coincidence algorithm. In certain embodiments, electronics 260, 262, and 264 are located above detectors 240 or below source 220.

Electronics 260 may include processor 262, memory 263, and power supply 264 for supplying power to gravel pack imaging tool 200. Power supply 264 may be a battery or may receive power from an external source such as a wireline (not shown). Processor 262 is adapted to receive measured data from radiation detectors 240. The measured data, which in certain embodiments includes count rates, may then be stored in memory 263 or further processed before being stored in memory 263. Processor 262 may also control the gain of the photomultiplier or other device for converting scintillations into electrical pulses. Electronics 260 may be located below source 220 and above detectors 240 or removed therefrom.

In one embodiment, the tool further includes an accelerometer, a 3 axis inclinometer or attitude sensor to unambiguously determine the position of an azimuthal segment. In certain embodiments, a compass device may be incorporated to further determine the orientation of the tool.

Fracture detection tool 200 may be constructed out of any material suitable for the downhole environment to which it is expected to be exposed, taking into account in particular, the expected temperatures, pressures, forces, and chemicals to which the tool will be exposed. In certain embodiments, suitable materials of construction for source collimator 225 and detector collimator 248 include, but are not limited to, sintered tungsten (known as heavy-met), lead, dense and very-high atomic number (Z) materials, or any combination thereof.

Further, while a 1$^{11}$/$_{16}$ inch diameter configuration tool is illustrated, the tool 100 can be sized as desired for a particular application. Those skilled in the art will appreciate that a larger diameter tool would allow more detectors and shielding to provide further segmentation of the view of the formation.

This tool may be deployed to detect fractures and to estimate their size. A person of ordinary skill in the art with the benefit of this disclosure will appreciate how to relate the log results of count rates and inferred densities of formation material to the structure of the formation and to reason from the results to the condition of the properties of the detected fractures.

Figure 3A:
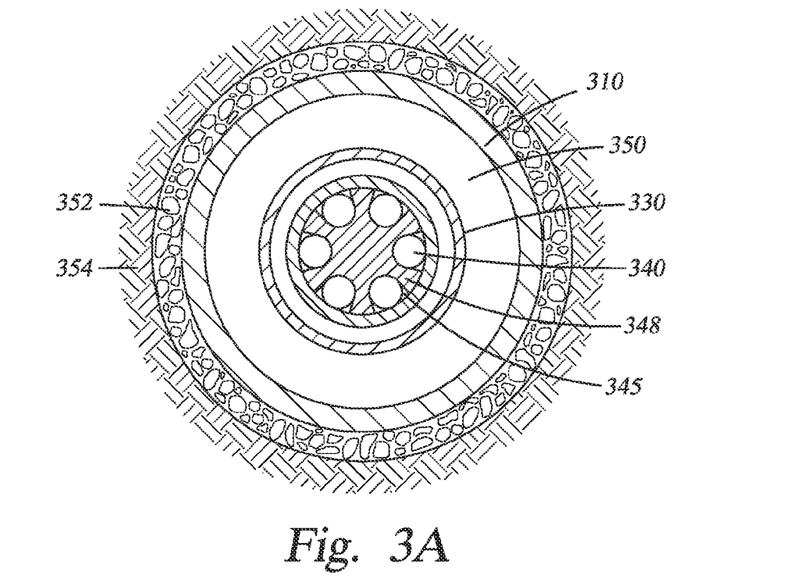
FIGS. 3A and 3B are sectional views of an example embodiment of the tool of FIG. 2 in accordance with the present invention.
Figure 3B:
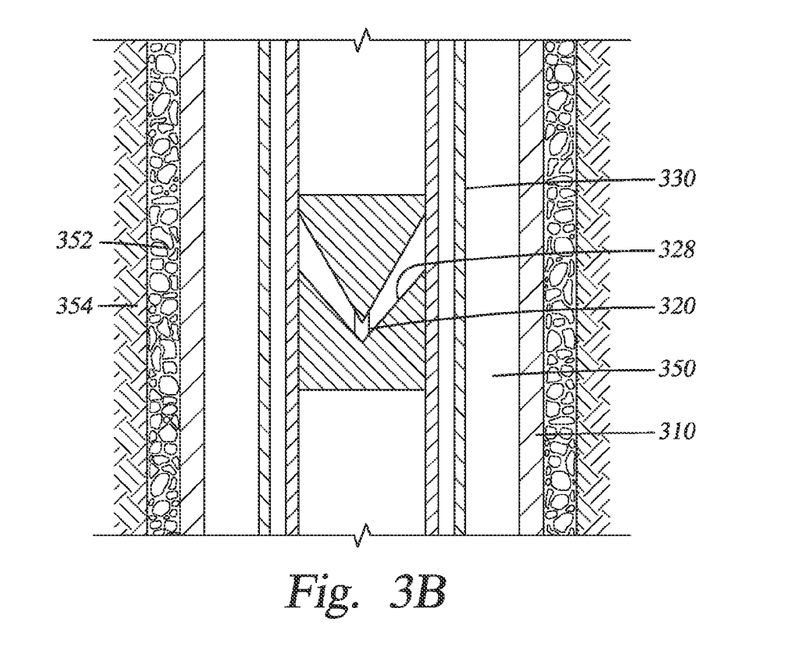

As a further illustration of an exemplary geometry of the embodiment illustrated in FIG. 2, FIGS. 3A and 3B show cross-sectional views of another embodiment of the tool disposed in base pipe or production tubing 330, which is further disposed in casing 310. An annulus 350 is defined between the casing 310 and the tubing 330, where FIG. 3A shows a cross-section taken from the X-Y plane and where FIG. 3B shows a cross-section taken from the X-Z plane. As shown in the illustrated embodiment, source collimator 328 is conical shaped in the X-Z plane or Y-Z plane. Detector 340 is shown in FIG. 3A in openings or slots 345, whereas radiation source 320 is shown depicted in FIG. 3B. As shown in FIG. 3A, detector collimators 348 are fan-shaped in the X-Y plane and rectangular in the X-Z or Y-Z planes. In certain embodiments, a conical source collimator 328 is desirable as it reduces multiple scattering events.

In addition to the energy levels of the radiation source, other factors that may be adjusted to discriminate segmented views of the formation include, but are not limited to the angle of the collimators and the source to detector spacing. Examples of suitable angles of the source collimator include, but are not limited to, angles from about 15 degree to about 85 degree and from about 65 degree to about 85 degree in other embodiments. Examples of suitable source to detector spacing include, but are not limited to, from about 1 inch to about 3.5 inches to about 8 inches, and in other embodiments, from about 6 inches to about 10 inches, and in still other embodiments to about 12 inches.

Moreover, it is recognized that the downhole tool is capable of measuring count rates while being lowered or raised in the wellbore. In certain embodiments, the downhole tool may perform measurements while the tool is stationary in the wellbore. Exemplary raising and lowering rates include displacement rates of up to about 1800 feet/hour.

Figure 4:
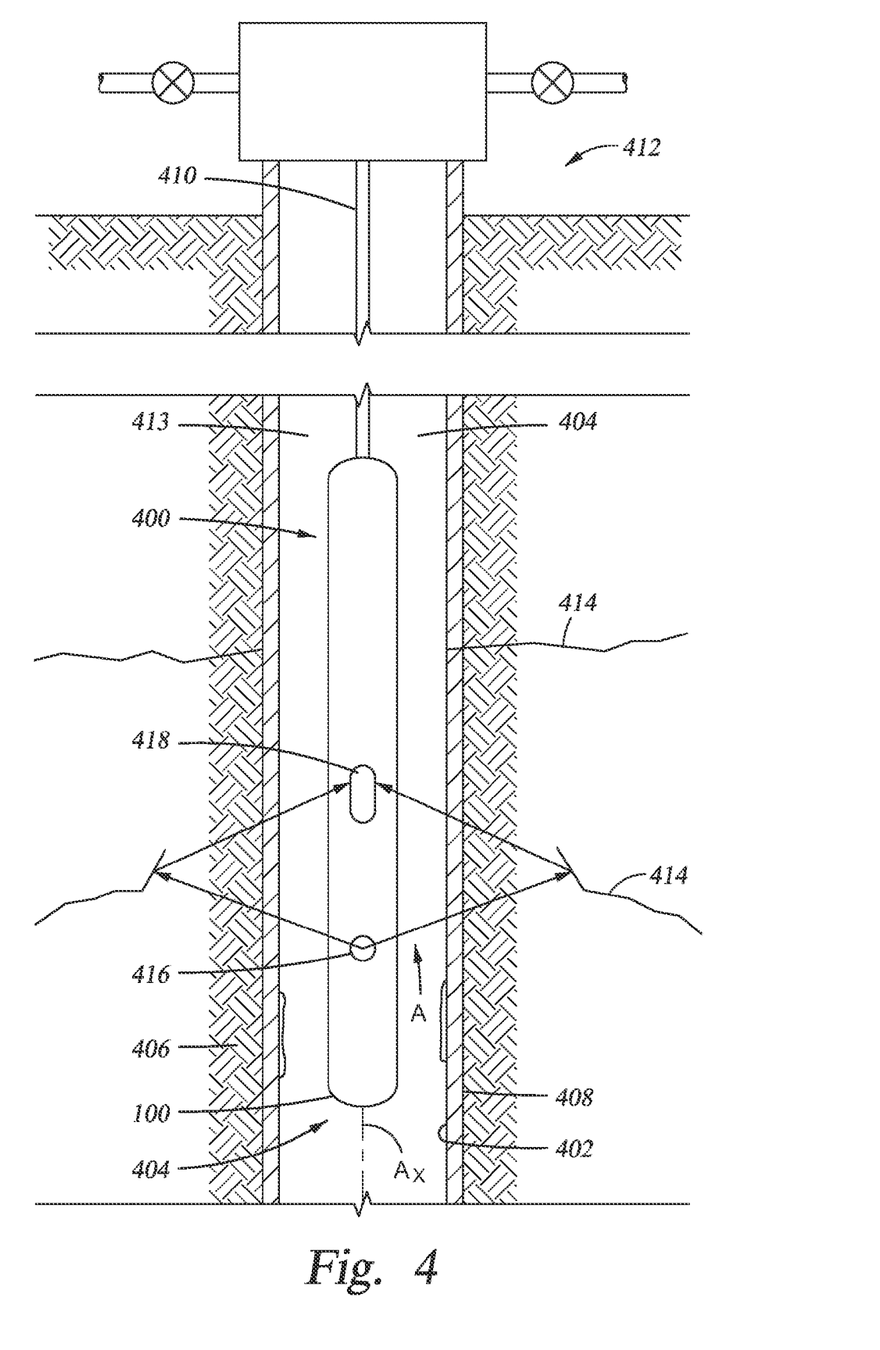
FIG. 4 is a side sectional view of an example method of an imaging tool in a wellbore that emits gamma rays to a surrounding formation in accordance with the present invention.

FIG. 4 illustrates in a partial side sectional view, an example of an imaging tool 400 inserted within a tubular 402. Embodiments exist wherein the tool 400 can be the same or substantially the same as the tools 100, 200 respectively of FIGS. 1 and 3 and described above. In the example of FIG. 4, the tubular 402 is inserted into a wellbore 404 that is shown intersecting a subterranean formation 406. Casing 408 is optionally provided in the wellbore 404 for lining the sidewalls of the wellbore 404. Thus in this example, the tubular 402 is production tubing. Alternate examples of use exist wherein the tool 400 is inserted within casing 408 having no production tubing within. The tool 400 is deployed in the wellbore 404 on a line 410, where the line 410 can be a wireline, slickline, cable, or coiled tubing. The line 410 is shown inserted through a wellhead assembly 412 that is mounted on surface above an opening to the wellbore 404. Fluid 413 is illustrated in the tubular 402 and surrounding the space between the tool 400 and walls of the tubular 402.

Further illustrated in the embodiment of FIG. 4 are fractures 414 in the formation 406 surrounding the wellbore 404. In an example, fractures 414 define a discontinuity in the formation 406 that may occur where adjacent portions of rock or other subterranean strata shear from one another. In the example of FIG. 4, the fractures 414 can range from less than a foot, to in excess of many feet. In an example, the presence of the fractures 414 can be detected with the tool 400. In an example, included with the embodiment of the tool 400 of FIG. 4 is a radiation source 420, which can be substantially the same as sources 220, 320 respectively of FIGS. 2 and 3B and described above. Further in the example of FIG. 4, a sensor 422 is included with the tool 400, wherein the sensor 422 includes detectors 140, 240 respectively of FIGS. 1 and 3 and discussed above. Radiation emitted from the source 420 can travel along a path represented by arrows A, which initially diverges from the axis $A_x$. Some of the radiation undergoes scattering and is redirected to converge with the axis $A_x$ at a location axially away from the source 420. As shown, the redirected radiation contacts sensor 422 where a count and associated energy of the radiation is detected.

Still referring to the example embodiment of FIG. 4, the radiation is directed in a conical pattern away from the source 420 and generally about a line intersecting the source 420 and sensor 422. As such, the radiation Compton scatters from the fluid 413 in the tubular 402, an area proximate the sidewall of the tubular 402, and the formation 406. At least some of the radiation scatters from materials in the fractures 414. It should be pointed out that paths the radiation follows from the source 416 to the sensor 418 are not limited to the select number of arrows A that are illustrated for clarity.

As is known, the energy of the radiation detected by the sensor 418 is affected by the Compton single-scatter angle of the radiation (i.e. the angle of the directional change of the radiation). Generally, the energy decreases with increasing scattering angles ; thus the radiation flowing from the source 416 to the sensor 418 which undergoes only minimal scattering will have a greater detected energy than the radiation single scattered over a large angle from adjacent the tubular 402 the formation 406. The radiation single scattered from adjacent the tubular 402 will have a greater detected energy than the radiation single scattered from the formation 406 because the average angles are shallower. In an example, radiation counts detected by sensor 418 are binned based on an energy level of each count. It is within the capabilities of those skilled in the art to identify the substances from which the radiation scatters based on the counts and corresponding energy of the created spectrum. Moreover, those skilled in the art are capable of identifying a spatial location of the identified substances.

In an example, source 416 and sensor 418 are set apart a designated distance so that the gamma rays from the source 416 scatter from a region 420 at the wall of the wellbore 408. Optionally, the range of the region 420 from which the gamma rays from the source 416 scatter extends radially outward past the wall of the wellbore 408 and to within the formation 406. Region 420 can be an annular space circumscribing the wellbore 404 and having a radial thickness ranging from a few inches to several feet. Detecting the actual number of Compton scattered gamma rays per unit time provides an indication of the density of material from which the gamma rays have scattered. Moreover, material filling a fracture 414 generally has a density different from the surrounding formation 406. Thus, a change in rate of gamma rays detected by sensor 418 can indicate that a fracture 414 is at the wall of the wellbore 404 or in the region 420.

In one non-limiting example of use of the tool 400 of FIG. 4, the tool 400 is raised within the wellbore 404 on wireline 410 while gamma rays emitted from the source 416 Compton scatter from the wall of the wellbore 402 and/or from within the region 420 around the wellbore 402. As discussed above, the location of scatter can depend on the relative locations of the source 416 and sensor 418. Also noted above, a fracture 414 at the wall of the wellbore 404, or in the region 420, can be identified by a change in the rate of gamma rays detected by sensor 418. Moreover, by correlating the depth of the tool 400 in the wellbore 402 with any changes in gamma ray detection rate, a height or width of a fracture 414 can be estimated. Advantages of using the method and tool 400 described herein include that fractures are identifiable with gamma ray detection that are outside the size range detectable by known acoustic means.

Figure 5:
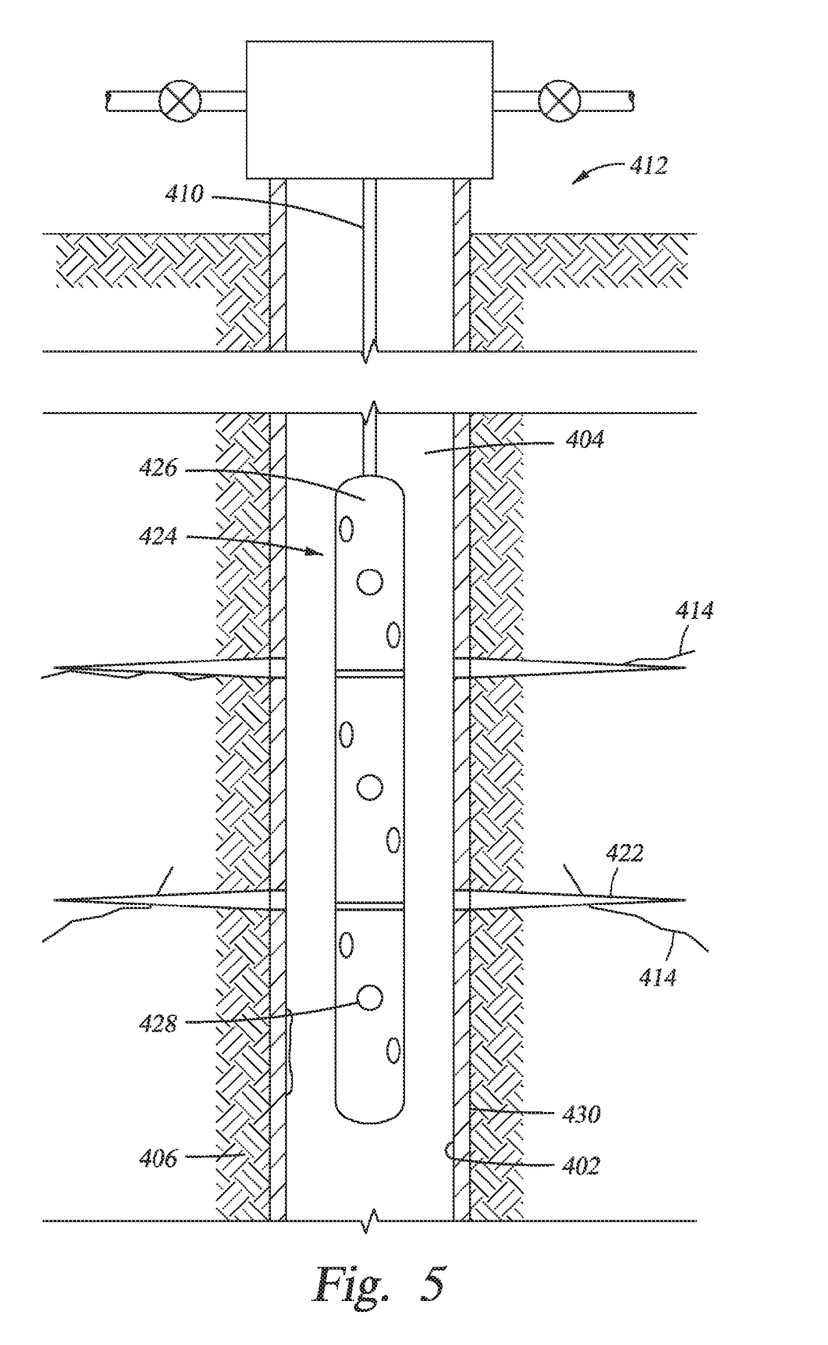
FIG. 5 is a side sectional view of an example of perforating the wellbore of FIG. 4 and in accordance with an embodiment of the present invention.

An additional advantage of utilizing Compton scattering of gamma rays to identify fractures 414 in the formation 406 surrounding the wellbore 404, is that their vertical and azimuthal locations can be identified with precision, as well as their size. As illustrated in FIG. 5, strategically placed perforations 422 can be formed in the formation 406 based on precise spatial information of the fractures 414 derived from use of the tool 400 described above. An example embodiment of a perforating string 424 is shown disposed in the wellbore 404 for forming the perforations 422. The string 424 includes a series of perforating guns 426 with shaped charges 428. In the example of FIG. 5, the shaped charges 428 are disposed at a depth in the wellbore 404 and oriented so that when they are detonated, an ensuing metal jet (not shown) creates perforations 422 across the wall of the wellbore 404 and into the formation 406 to intersect with the fractures 414. In the example of FIG. 5, the tubular 402 lining the wellbore 404 is wellbore casing, and cement 430 is disposed in the annular space between the casing and wall of the wellbore 404. Thus the perforation 422 also extends through the casing and the cement 430. The intersection between the perforations 422 and fractures 414 create fluid communication between fractures 414 and the wellbore 404. Embodiments exist wherein the formation 406 is a shale formation adjacent a formation (not shown) having a hydrocarbon bearing reservoir; and wherein a fracture 414 extends into the adjacent formation and into communication with hydrocarbons therein. Thus intersecting fracture 414 that extends into the adjacent formation with a perforation 422 necessarily communicates the wellbore 404 with the hydrocarbon bearing reservoir.

What is claimed is:

1. A method of wellbore operations comprising:
    a) directing radiation from a source to a formation surrounding the wellbore;
    b) detecting radiation scattered from the formation;
    c) estimating a rate and energy of the detected radiation;
    d) estimating a density of the formation based on the step of estimating a rate and energy of the detected radiation; and
    e) identifying a fracture in the formation based on the step of estimating a density of the formation.

2. The method of claim 1, wherein the wellbore is lined with casing, so that at least some of the radiation from the source passes through a wall of the casing from inside the casing, and wherein at least a portion of the radiation scattered from the formation passes back through the wall of the casing from outside of the casing.

3. The method of claim 1, wherein the step of detecting radiation is performed using a detector axially offset from the source.

4. The method of claim 3, wherein the radiation is directed in a substantially conical pattern from the source and wherein the energy of the detected radiation is dependent upon an angle of scatter of the radiation.

5. The method of claim 1, further comprising estimating a thickness of the fracture.

6. The method of claim 1, further comprising estimating a location of the fracture.

7. The method of claim 1, wherein the fracture intersects a wall of the wellbore.

8. The method of claim 1, further comprising identifying a perforation in the formation based on the rate and energy of the detected radiation.

9. The method of claim 1, further comprising forming a perforation that extends through a wall of the casing and intersects the fracture.

10. A method of operations in a wellbore that is lined with casing comprising:
    a) providing a logging instrument having a radiation detector and a radiation source that emits gamma rays;
    b) disposing the logging instrument into the wellbore and inside the casing;
    c) directing gamma rays from the source to a formation surrounding the wellbore and along a path, so that at least some of the gamma rays scatters in a direction back from the formation towards the radiation detector;
    d) detecting the gamma rays that scattered from the formation with the radiation detector; and
    e) identifying a fracture in the formation based on a change of rate of the gamma rays detected.

11. The method of claim 10, further comprising disposing the radiation source and radiation detector apart a designated distance so that the gamma rays detected by the radiation detector are scattered from a wall of the wellbore.

12. The method of claim 10, further comprising disposing the radiation source and radiation detector apart a designated distance so that the gamma rays detected by the radiation detector are scattered from an annular region of the formation that circumscribes the wellbore.

13. The method of claim 10, further comprising providing a multiplicity of detectors at spaced apart locations around a circumference of the logging instrument, viewing different circumferentially spaced apart segments with the detectors, and imaging substantially an entire circumference of a lengthwise portion of the tubular.

14. The method of claim 10, further comprising repeating steps (b)-(e) while moving the logging instrument to different depths in the wellbore.

15. The method of claim 14, further comprising estimating a vertical thickness of the fracture based on the depths at which a change of rate of the radiation is detected.

16. The method of claim 10, further comprising estimating a location of the fracture by monitoring a depth of the logging tool.

17. The method of claim 16, wherein the formation is adjacent a hydrocarbon bearing formation; and the fracture is in communication with fluid in the hydrocarbon bearing formation.

18. The method of claim 17, further comprising providing fluid communication between the wellbore and the hydrocarbon bearing formation by forming a perforation that extends through the casing and the formation, and that intersects with the fracture.

19. The method of claim 10, further comprising identifying a perforation in the formation based a change of rate of the radiation detected.

20. The method of claim 10, further comprising forming a perforation that extends through a wall of the casing and intersects the fracture.

* * * * *